United States Patent
Solheim

(12) 
(10) Patent No.: US 6,913,700 B2
(45) Date of Patent: Jul. 5, 2005

(54) METHOD OF AND ARRANGEMENT FOR CONTINUOUS HYDROLYSIS OF ORGANIC MATERIAL

(75) Inventor: Odd Egil Solheim, Hvalstad (NO)

(73) Assignee: Cambi AS, Billingstad (NO)

( * ) Notice: Subject to any disclaimer, the term of this patent is extended or adjusted under 35 U.S.C. 154(b) by 0 days.

(21) Appl. No.: 10/796,639

(22) Filed: Mar. 9, 2004

(65) Prior Publication Data

US 2004/0168990 A1 Sep. 2, 2004

Related U.S. Application Data

(63) Continuation of application No. 09/980,424, filed as application No. PCT/NO00/00176 on May 26, 2000, now abandoned.

(30) Foreign Application Priority Data

May 31, 1999 (NO) .......................................... 19992612

(51) Int. Cl.$^7$ ............................................... C02F 11/18
(52) U.S. Cl. ........................ 210/774; 210/808; 210/766
(58) Field of Search ................................. 210/609, 612, 210/613, 750, 761, 766, 768, 769, 774, 808; 422/26

(56) References Cited

FOREIGN PATENT DOCUMENTS

WO          WO 96/09882 A1  *  4/1996     .............. B01J/3/02

* cited by examiner

*Primary Examiner*—Robert James Popovics
(74) *Attorney, Agent, or Firm*—Jenkens & Gilchrist, P.C.

(57) ABSTRACT

A method of and an arrangement for continuous hydrolysis of organic material in the form of sludge with a dry solids content of 1–20%. A sludge containing the organic material with a low content of abrasive components and a dry solids content of 1–20% is heated to a temperature of approximately 100° C. The sludge is mixed with steam at a pressure of 1–4 bars. The sludge/steam mixture is lead to a preheating tank. The pressure of the sludge/steam mixture is increased from 3 to 10 bars. The sludge-steam mixture is lead to a reactor. A depressurizing tank depressurizes the sludge/steam mixture to 1–4 bars. The sludge and steam are separated and may be cooled.

6 Claims, 1 Drawing Sheet

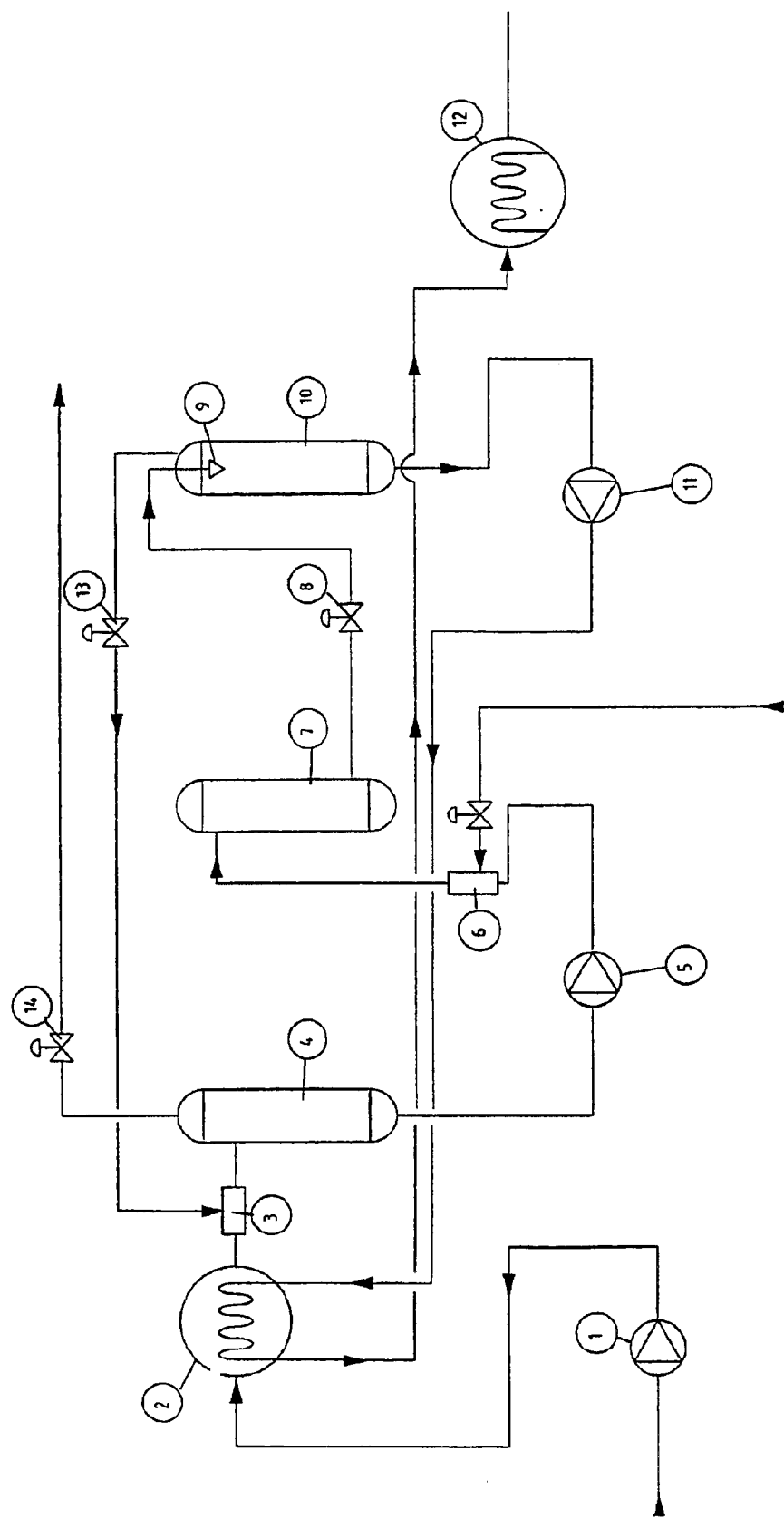

METHOD OF AND ARRANGEMENT FOR CONTINUOUS HYDROLYSIS OF ORGANIC MATERIAL

CROSS-REFERENCE TO RELATED APPLICATIONS

This application is a continuation of U.S. patent application Ser. No. 09/980,424 filed Nov. 27, 2001, which was the National Stage Application of International Application No. PCT/NO00/00176, filed May 26, 2000.

The present invention regards a method of and arrangement for continuous hydrolysis of organic material in accordance with the introductory part of the independent claims.

A method and arrangement used for hydrolysis of organic material under reducing conditions is known from Norwegian patent no. 300094. This method and this arrangement are highly suitable for thermal hydrolysis of organic material that contains abrasive materials (e.g. sand). A typical material that is well suited for treatment by use of this process is sludge from sewage treatment plants.

A method of and arrangement for treatment of organic waste through use of a cylindrical reactor for continuous hydrolysis is known from international patent application WO9855408.

A method for oxidation-based treatment of a medium containing organic components is known from Norwegian patent application no. 964655. This method comprises two process stages, whereupon the medium in the first stage is heated to a pre-set temperature. The medium is then brought to a second process stage, where it is heated to 140–200° C. in a pressure range from 3 to 30 bar, an oxygen-containing gas being led into the medium. Hydrogen peroxide is added to the medium between the first and the second stage. This is a wet oxidation process that from an economic point of view is not particularly expedient, due to the high costs associated with the addition of acid and hydrogen peroxide.

New international purification requirements result in the creation of types of sludge that contain little in the way of abrasive components. Examples of such materials are:

Sludge from biological treatment plants for KOF-purification in the wood-processing industry Sludge from biological treatment plants in the chemical industries Sludge from biological treatment plants in the food processing industry The arrangement and method according to Norwegian patent 300094 may be used for this type of sludge, however is entails high investment costs.

The object of the present invention is therefore to provide an arrangement for and a method of treating sludge with a low content of abrasive components, which results in the investment cost being reduced to the greatest possible extent.

This is obtained through a method of continuous hydrolysis of organic material, which method is characterised by including the following steps:
a) heating a sludge containing the organic material with a low content of abrasive components and a dry solids content of 1–20%, to a temperature of approximately 100° C.,
b) mixing the sludge with steam at a pressure of 1–4 bar a,
c) leading the sludge/steam mixture to a preheating tank,
d) increasing the pressure of the sludge/steam mixture from 3 to 10 bar a,
e) leading the sludge/steam mixture to a reactor,
e) depressurising the sludge/steam mixture to 1–4 bar a in a depressurising tank,
f) separating sludge and steam, and possibly
g) cooling the sludge further.

The sludge in step a) is preferably heated through heat exchange with the sludge from step f).

The residence time for the sludge/steam mixture in the reactor is preferably from 5 to 60 minutes, at a temperature of preferably 130–180° C.

The depressurisation of the sludge/steam mixture in the depressurisation tank is preferably accomplished by means of one or more nozzles.

Steam from the depressurisation tank is preferably mixed with the sludge in step b).

The invention also regards an arrangement for continuous hydrolysis of organic material in the form of sludge with a dry solids content of 1–20%, which arrangement includes:
(i) a feed pump connected to a first heat exchanger for heating the incoming sludge through heat exchange with the outgoing sludge,
(ii) a mixing device for mixing the sludge with steam, connected to the first heat exchanger,
(iii) a preheating tank connected to the mixing device,
(iv) a pump for increasing the pressure of the steam/sludge mixture by from 3 to 10 bar a, connected to the preheating tank,
(v) a reactor at a temperature of 130–180° C., connected to the pump,
(vi) a depressurising tank connected to the reactor, which depressurising tank includes a nozzle for depressurising the steam/sludge mixture to 1–4 bar a.

The depressurising tank is preferably connected to a pump for pumping sludge from the depressurising tank to the first heat exchanger.

The depressurising tank preferably includes a control valve with associated lines for controlling steam from the depressurising tank to the mixing device.

In the following, the invention will be explained in greater detail through an example of an embodiment with reference to the accompanying drawings.

FIG. 1 schematically shows an embodiment of the arrangement in accordance with the present invention.

In FIG. 1, a sludge with a low content of abrasive materials, with a dry solids content of 1–20%, is led via a feed pump 1 to a sludge/sludge heat exchanger 2, in which the incoming sludge is heated with the outgoing sludge from the process. This heat exchanger 2 is used when the sludge is thin (i.e. 2–6% dry solids), and the sludge is preheated to e.g. 100° C. If the sludge is thicker (e.g. 6–20% dry solids), use of the heat exchanger must be evaluated for each individual case. Portions of the sludge volume may then be bypassed, or the sludge may be diluted with water.

The sludge is then led to a steam/sludge mixing unit 3 in which used steam from the depressurising tank 10 in the process is used. The used steam has a pressure of 1–4 bar a. The sludge is here preheated to a temperature of 100–144° C. and enters a preheating tank 4, in which the level is kept constant.

From the preheating tank 4, the sludge passes into a feed pump 5, where the pressure is increased from 3 to 10 bar a. Then the sludge is led to a mixing unit 6 for steam/sludge, where steam is added. The pressure of the added steam must always be higher than that delivered by the feed pump 5.

From the mixing unit 6, the sludge passes into a reactor 7, where the residence time is variable from 5 to 60 seconds by adjusting the level in the reactor.

Measurements of the pressure/temperature in the reactor 7 are used to control the admission of fresh steam. The temperature of the reactor 7 may be varied between 130 and 180° C.

From the reactor 7, the sludge passes out through a control valve 8, and then through one or more nozzles 9, before flowing into the depressurising tank 10. An instantaneous pressure reduction takes place in the nozzle(s) 9. The pressure decreases to 1–4 bar a in the depressurising tank 10, and the steam is separated from the liquid. The liberated stream is led back to the mixing unit 3 for steam/sludge via a pressure control valve 13.

From the depressurising tank 10, the sludge is transported via a pump 11 to the sludge/sludge heat exchanger 2, where the sludge from the depressurising tank heats the incoming sludge. From this heat exchanger 2, the treated sludge is led to a cooler 12, in which the sludge is cooled to the desired final temperature.

Small amounts of inert gases are formed during the process. These will ultimately collect in the preheating tank 4. These inert gases are led out of the preheating tank via a control valve 14, a passed on further to an odour destruction plant.

Biological sludge that is treated in this manner will have changed its character completely through the process. The process operates through the addition of steam only. A chemical transformation of the sludge takes place in the reactor 7 forming, among other things, organic acids. The term "hydrolysis" means to chemically decompose a material in water.

With the overflowing to the depressurising tank 10 through the nozzle 9, a sudden pressure reduction, and thereby temperature reduction occurs. This "steam explosion" effectively breaks up the cells in the sludge, thereby releasing cell-bound water and dissolving solids. The fraction of solids dissolved in water according to this method varies from approximately 40% to approximately 80%.

Organic sludge treated in this manner is therefore very easy to subject to secondary treatment in an anaerobic process.

The result of the process according to the present invention is that, instead of having a disposal problem regarding a lot of wet sludge, and the associated, high costs, one ends up being able to make use of 60–80% of the energy contained in the dry solids in the sludge, as biogas.

The residual amounts from the anaerobe process are now greatly reduced. The costs associated with secondary treatment of the residual amount are also greatly reduced due to the volume reduction, while the biogas that is formed has commercial value. It also becomes easier to dewater the residual amount, thus making transport more reasonable or final destruction through burning more attractive.

What is claimed is:

1. A method of continuous hydrolysis of organic material, the method comprising the steps of:
   heating a sludge in a heat exchanger, wherein the sludge contains the organic material with a low content of abrasive components and a dry solids content of 1–20%, to a temperature of approximately 100° C.;
   mixing the sludge with steam at a pressure of 1–4 bars in a first mixing unit;
   leading the sludge/steam mixture to a preheating tank;
   increasing the pressure of the sludge/steam mixture from 3 to 10 bars in a second mixing unit;
   leading the sludge/steam mixture to a reactor;
   depressurizing the sludge/steam mixture to 1–4 bars in a depressurizing tank; and
   separating sludge and steam.

2. The method in accordance with claim 1, wherein the sludge from the heating step is heated through heat exchange in the heat exchanger with the sludge from the separating step.

3. The method in accordance with claim 1 or 2, wherein the residence time for the sludge/steam mixture in the reactor is from 5 to 60 minutes at a temperature of 130–180° C.

4. The method in accordance with claim 1, wherein the depressurizing of the sludge/steam mixture in the depressurizing tank is carried out by means of one or more nozzles.

5. A method in accordance with claim 1, wherein steam from the depresurizing tank is mixed with the sludge in the mixing step.

6. The method in accordance with claim 1, further comprising the step of cooling the sludge.

* * * * *